(12) United States Patent
Kim et al.

(10) Patent No.: US 12,489,386 B2
(45) Date of Patent: Dec. 2, 2025

(54) MOTOR DRIVING APPARATUS AND METHOD OF CONTROLLING THE SAME

(71) Applicants: Hyundai Motor Company, Seoul (KR); Kia Corporation, Seoul (KR)

(72) Inventors: Sung Do Kim, Seoul (KR); Joo Yeon Kim, Seoul (KR); Min Su Kang, Paju-si (KR); Chang Seok You, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 230 days.

(21) Appl. No.: 18/218,231

(22) Filed: Jul. 5, 2023

(65) Prior Publication Data
US 2024/0223119 A1    Jul. 4, 2024

(30) Foreign Application Priority Data

Dec. 28, 2022  (KR) .......................... 10-2022-0187505

(51) Int. Cl.
| | |
|---|---|
| *H02P 21/00* | (2016.01) |
| *H02P 21/18* | (2016.01) |
| *H02P 21/22* | (2016.01) |
| *H02P 27/12* | (2006.01) |

(52) U.S. Cl.
CPC .............. *H02P 27/12* (2013.01); *H02P 21/18* (2016.02); *H02P 21/22* (2016.02)

(58) Field of Classification Search
CPC ........... H02P 27/12; H02P 27/18; H02P 21/22

USPC ................................................ 318/400.2, 811
See application file for complete search history.

(56) References Cited

U.S. PATENT DOCUMENTS

| | | | | |
|---|---|---|---|---|
| 2011/0062903 | A1* | 3/2011 | Li ........................... | H02P 21/24 318/400.02 |
| 2011/0285337 | A1* | 11/2011 | Taniguchi ............... | H02P 21/24 318/400.34 |
| 2012/0001573 | A1* | 1/2012 | Kimpara ............. | H02P 21/0003 318/400.02 |
| 2020/0403549 | A1* | 12/2020 | Lee ......................... | H02P 23/14 |
| 2022/0294377 | A1* | 9/2022 | Takahashi ................. | H02P 6/34 |

FOREIGN PATENT DOCUMENTS

| | | |
|---|---|---|
| KR | 10-2018-0049333 A | 5/2018 |
| KR | 10-2019-0025796 A | 3/2019 |

* cited by examiner

*Primary Examiner* — Erick D Glass
(74) *Attorney, Agent, or Firm* — Morgan, Lewis & Bockius LLP (57) ABSTRACT

A motor driving apparatus and a method of driving the same are disclosed. The motor driving apparatus includes a motor, an inverter configured to drive the motor based on a switching signal, and a controller configured to output the switching signal when pulse width modulation control is performed, to stop the pulse width modulation control when a predetermined condition is satisfied, and to apply a zero-voltage vector pulse to the switching signal in a period in which execution of the pulse width modulation control is stopped, for determination of a current speed estimation value of the motor.

16 Claims, 7 Drawing Sheets

MOTOR DRIVING APPARATUS AND METHOD OF CONTROLLING THE SAME

CROSS-REFERENCE TO RELATED APPLICATION

This application claims the benefit of priority to Korean Patent Application No. 10-2022-0187505, filed on Dec. 28, 2022 in the Korean Intellectual Property Office, the disclosure of which is incorporated herein by reference.

BACKGROUND

1. Technical Field

The present disclosure relates to a motor driving apparatus for driving a sensorless motor and a method of controlling the same.

2. Description of the Related Art

A motor driving apparatus may be used in an air compressor, etc. of a fuel cell electric vehicle (FCEV), and may drive a motor including a rotor configured to perform rotation and a stator with a coil wound therearound.

In general, the motor driving apparatus determines a position of the rotor using a position sensor such as a Hall sensor. In the case in which the position sensor is omitted, however, the motor driving apparatus may drive the motor through a sensorless control system configured to determine a position of the rotor by estimating counter electromotive force of the motor.

In this case, the motor driving apparatus may drive the motor by outputting a signal for switching a switching element included in an inverter based on pulse width modulation (PMW) control.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure has been made in view of the above problems, and provides a motor driving apparatus configured to drive a sensorless motor based on pulse width modulation control and to stop execution of pulse width modulation control when a predetermined condition is satisfied, thereby being capable of enhancing efficiency thereof, and a method for controlling the same.

It is another object of the present disclosure is to provide a motor driving apparatus configured to estimate a current position and a current speed of the motor through application of a zero-voltage vector pulse to a switching signal input to an inverter in a period in which execution of pulse width modulation control is stopped, and a method for controlling the same, thereby being capable of stably controlling the current and speed of a sensorless motor when pulse width modulation control is performed again.

Objects of the present disclosure are not limited to the above-described objects, and other objects of the present disclosure not yet described will be more clearly understood by those skilled in the art from the following detailed description.

In accordance with an aspect of the present disclosure, the above and other objects can be accomplished by the provision of a motor driving apparatus including a motor, an inverter configured to drive the motor based on a switching signal, and a controller configured to output the switching signal when pulse width modulation control is performed, to stop the pulse width modulation control when a predetermined condition is satisfied, and to apply a zero-voltage vector pulse to the switching signal in a period in which execution of the pulse width modulation control is stopped, for determination of a current speed estimation value of the motor.

In accordance with another aspect of the present disclosure, there is provided a method of controlling a motor driving apparatus, the method including driving a motor by outputting a switching signal to an inverter, when pulse width modulation control is performed, stopping execution of the pulse width modulation control when a predetermined condition is satisfied, and applying a zero-voltage vector pulse to the switching signal in a period in which execution of the pulse width modulation control is stopped, for determination of a current speed estimation value of the motor.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, preferred embodiments of the present disclosure will be described in detail with reference to the accompanying drawings, and the same or similar elements are designated by the same reference numerals regardless of the numerals in the drawings and redundant description thereof will be omitted.

In describing the present disclosure, moreover, a detailed description will be omitted when a specific description of publicly known technologies to which the disclosure pertains is judged to obscure the gist of the present disclosure. In addition, it should be noted that the accompanying drawings are merely illustrated to easily explain the spirit of the disclosure, and therefore, should not be construed as limiting the spirit of the disclosure to the accompanying drawings. On the contrary, the disclosure is to cover all modifications, equivalents, and alternatives falling within the spirit and scope of the disclosure as defined by the claims.

In the following description of embodiments, the term "predetermined" means that, when a parameter is used in a process or an algorithm, the numerical value of the parameter has been previously determined. The numerical value of the parameter may be set when the process or the algorithm is begun or during a period in which the process or algorithm is executed in accordance with an embodiment.

In the meantime, although terms including an ordinal number, such as first or second, may be used to describe a variety of constituent elements, the constituent elements are not limited to the terms, and the terms are used only for the purpose of discriminating one constituent element from other constituent elements.

It will be understood that, when one element is referred to as being "connected to" or "coupled to" another element, one element may be "connected to" or "coupled to" another element via a further element although one element may be directly connected to or directly coupled to another element. On the other hand, it will be understood that, when an element is referred to as being "directly connected to" or "directly coupled to" another element, there is no intervening element present.

As used in the description of the disclosure and the appended claims, the singular forms are intended to include the plural forms as well, unless context clearly indicates otherwise.

It will be further understood that the terms "comprises" and/or "comprising," or "includes" and/or "including" when used in this specification, specify the presence of stated features, regions, integers, steps, operations, elements, and/or combinations thereof, but do not preclude the presence or addition of one or more other features, regions, integers, steps, operations, elements, components, and/or combinations thereof.

A controller may include a communication device configured to communicate with another controller or a sensor, for control of a function to be performed thereby, a memory configured to store an operating system, logic commands, input/output information, etc., and at least one processor configured to execute discrimination, calculation, determination, etc. required for control of the function to be performed.

Figure 1:
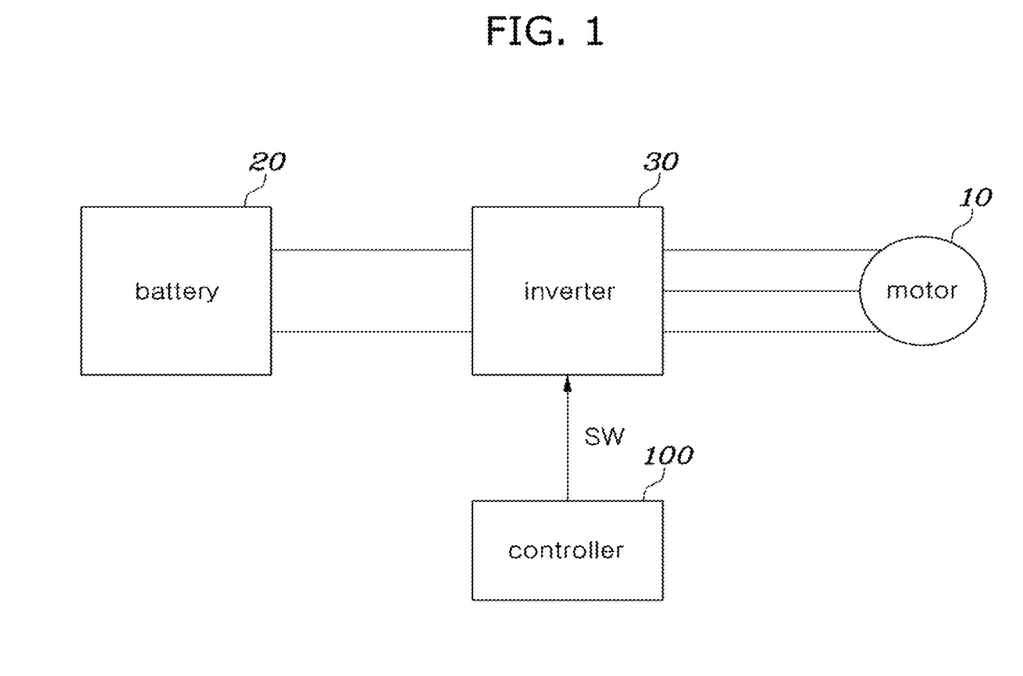
FIG. 1 is a block diagram showing a configuration of a motor driving apparatus according to an exemplary embodiment of the present disclosure.

FIG. 1 is a block diagram showing a configuration of a motor driving apparatus according to an exemplary embodiment of the present disclosure.

Referring to FIG. 1, the motor driving apparatus according to the exemplary embodiment of the present disclosure may include a motor 10 including a plurality of windings respectively corresponding to a plurality of phases, a battery 20, an inverter 30 configured to convert a voltage of the battery 20 into an AC voltage based on a switching signal SW, thereby driving the motor 10, and a controller 100 configured to output the switching signal SW when pulse width modulation control is performed, thereby switching switch elements included in the inverter 30.

The controller 100 may determine a current position estimation value and a current speed estimation value of the motor 10 without using a position sensor such as a Hall sensor, and may perform sensorless control for driving of the motor 10 based on results of the determination. In this embodiment, the current position of the motor 10 may correspond to a current position of a rotor included in the motor 10, and the current speed of the motor 10 may correspond to a current angular velocity of the rotor included in the motor 10.

During execution of pulse width modulation control, the controller 100 may estimate counter electromotive force of the motor 10 based on current control for the motor 10, so as to determine a current speed estimation value of the motor 10, and may adjust a duty ratio of the switching signal SW such that the current speed estimation value traces a value of a speed command for the motor 10. In this case, the controller 100 may receive the speed command value from an upper-level controller (not shown) of the controller 100.

When a predetermined condition is satisfied in a state in which pulse width modulation control is performed, the controller 100 may stop execution of the pulse width modulation control, and may perform motor torque on/off control in order to enhance efficiency of the motor driving apparatus. In this case, the predetermined condition may be satisfied when the speed command value for the motor 10 and the current speed estimation value of the motor 10 are not higher than a predetermined controllable speed in a state in which pulse width modulation control is performed.

Upon performing motor torque on/off control, the controller 100 may determine a current position and a current speed of the motor 10 in a period in which execution of pulse width modulation control is stopped, and may control the current and speed of the motor 10 based on results of the determination when pulse width modulation control is performed again. Here, a "period" used herein may refer to a section of time including a certain length of time in which a series of events or a single action is performed. The period may occur one time or may be recurring.

Of course, in the period in which pulse width modulation control is stopped, counter electromotive force of the motor 10 is not formed. For this reason, the current and speed of the sensorless motor may be unstable when pulse width modulation control is performed again in the case in which the controller 100 estimates counter electromotive force of the sensorless motor in order to determine the current position and the current speed of the motor 10 in the period in which pulse width modulation control is stopped.

To this end, this embodiment proposes stably controlling the current and speed of the sensorless motor, when pulse width modulation control is performed again, by estimating the current position and the current speed of the motor 10 through application of a zero-voltage vector pulse to a switching signal SW applied to the inverter 30 in a period in which execution of pulse width modulation control is stopped.

Figure 2:
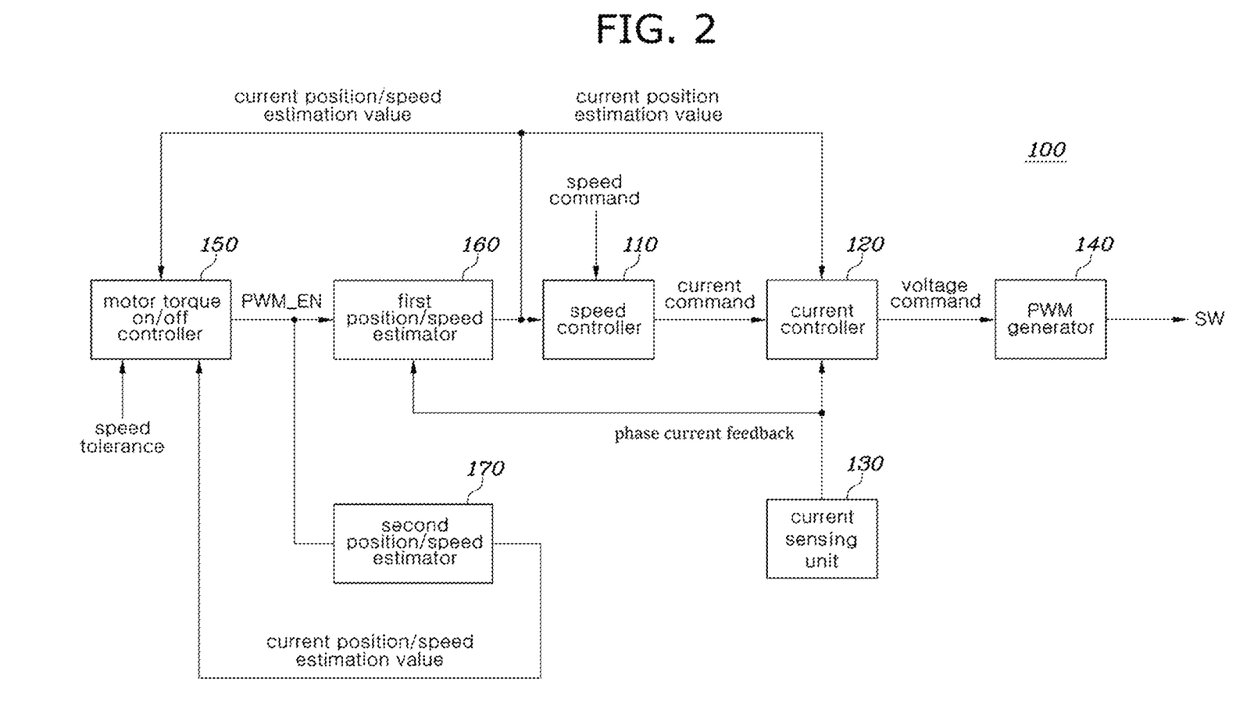
FIG. 2 is a block diagram showing a configuration of a controller according to an exemplary embodiment of the present disclosure.

FIG. 2 is a block diagram showing a configuration of the controller according to an exemplary embodiment of the present disclosure.

As shown in FIG. 2, the controller 100 may include a speed controller 110, a current controller 120, a current sensing unit 130, a pulse width modulation (PWM) generator 140, a motor torque on/off controller 150, a first position/speed estimator 160, and a second position/speed estimator 170. Each of the controller, sensing unit, generator, and estimator (e.g., elements 110-170 of the controller 100) may be a processor (e.g., computer, microprocessor, CPU, ASIC, circuitry, logic circuits, etc.) and may be implemented by a non-transitory memory storing, e.g., a program(s), software instructions reproducing algorithms, etc., which, when executed, performs various functions described hereinafter, and a processor configured to execute the program(s), software instructions reproducing algorithms, etc.

The speed controller 110 of the controller 100 may receive a speed command for a motor from an upper-level controller (not shown), and may set a value of a current command such that a current speed estimation value of the motor 10 traces a value of the speed command.

The current controller 120 of the controller 100 may receive a phase current feedback from the current sensing unit 130, so as to determine the phase current of the motor 10. The current controller 120 may set a value of a voltage command such that the phase current of the motor 10 traces the current command value.

The current sensing unit 130 of the controller 100 may obtain the phase current of the motor 10 through a current sensor.

The PWM generator 140 of the controller 100 may adjust a duty ratio of a switching signal SW in accordance with the voltage command value, based on pulse width modulation control.

The motor torque on/off controller 150 of the controller 100 may perform motor torque on/off control by controlling whether or not a PWM enable signal PWM_EN should be activated. The PWM enable signal PWM_EN may be activated for execution of pulse width modulation control, and may be deactivated for stop of execution of pulse width modulation control. In more detail, when a predetermined condition is satisfied in a state in which pulse width modulation control is performed, the motor torque on/off controller 150 may deactivate the PWM enable signal PWM_EN in order to stop execution of the pulse width modulation control. In addition, when a difference between a value of a speed command and a current speed estimation value of the motor 10 exceeds a speed tolerance in a state in which execution of pulse width modulation control is stopped, the motor torque on/off controller 150 may activate the PWM enable signal PWM_EN in order to perform pulse width modulation control again. In this case, the value of the speed tolerance may be input to the controller 100 from the upper-level controller (not shown) of the controller 100.

The first position/speed estimator 160 of the controller 100 may determine a current position estimation value and a current speed estimation value of the motor 10 by estimating counter electromotive force of the motor 10 when pulse width modulation control is performed in accordance with the PWM enable signal PWM_EN. In this case, the first position/speed estimator 160 may feedback the current position estimation value and the current speed estimation value to the motor torque on/off controller 150, and may feedback the current position estimation value to the current controller 120.

The second position/speed estimator 170 of the controller 100 may apply a zero-voltage vector pulse to the switching signal SW when execution of pulse width modulation control is stopped in accordance with the PWM enable signal PWM_EN, so as to determine the current position estimation value and the current speed estimation value of the motor 10. In this case, the second position/speed estimator 170 may feedback the current position estimation value and the current speed estimation value to the motor torque on/off controller 150. In this embodiment, the zero-voltage vector pulse may be defined as a pulse independent from an output torque of the motor 10. For example, when the zero-voltage vector pulse is applied to the switching signal SW, all switch elements of an inverter connected to a positive electrode of a battery may be turned on, and all switch elements of the inverter connected to a negative electrode of the battery may be turned off.

Figure 3:
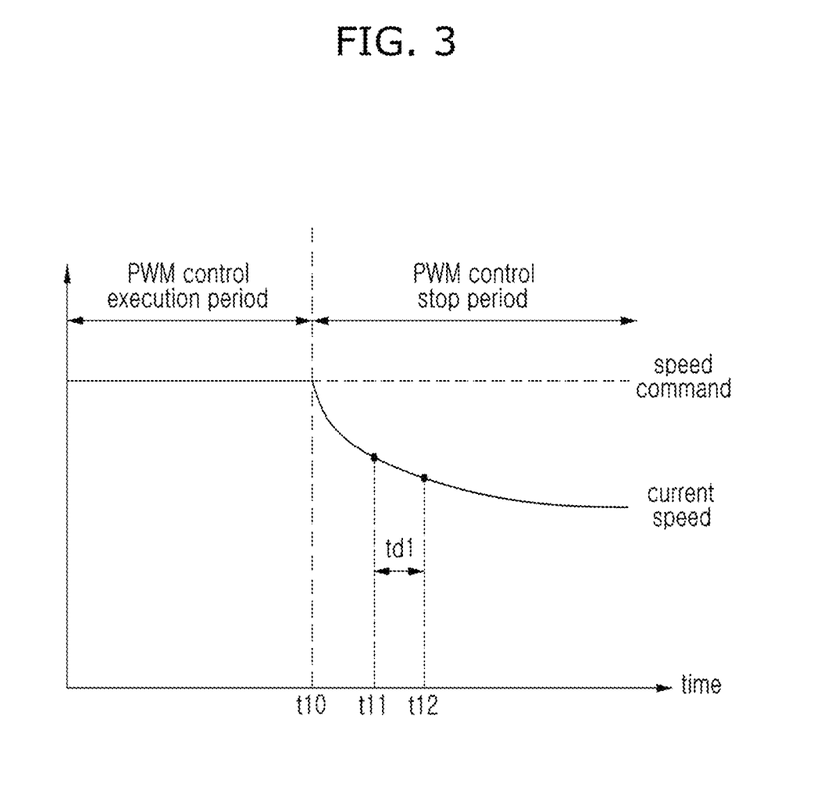
FIG. 3 is a graph explaining a procedure in which the controller according to an exemplary embodiment of the present disclosure estimates a current position and a current speed of the motor.

FIG. 3 is a graph explaining a procedure in which the controller according to the exemplary embodiment of the present disclosure estimates a current position and a current speed of the motor 10.

Referring to FIG. 3, when the PWM enable signal PWM_EN is deactivated from "1" to "0" at time t10, the controller 100 may stop execution of pulse width modulation control.

Before time t10, the controller 100 may estimate counter electromotive force of the motor 10 through execution of pulse width modulation control, so as to determine a current position estimation value and a current speed estimation value of the motor 10. Based on results of the determination, the controller 100 may control the motor 10 such that the current speed estimation value of the motor 10 traces a value of a speed command.

After time t10, the motor 10 may be in an inertia braking state in which the motor 10 is reduced in speed without current control, in accordance with stop of execution of the pulse width modulation control.

At time t11, the controller 100 may apply a zero-voltage vector pulse to a switching signal input to the inverter. The controller 100 may determine a current position estimation value of the motor 10 based on results of sensing of current of the motor 10 at time t11 when the zero-voltage vector pulse is applied.

At time t12 (a time after a predetermined time duration td1 elapses from time t11), the controller 100 may apply the zero-voltage vector pulse to the switching signal, similarly to the procedure at time t11, and may determine a current position estimation value of the motor 10 based on results of sensing of current of the motor 10 at time t12 when the zero-voltage vector pulse is applied.

Thereafter, the controller 100 may determine a current speed estimation value using the current position estimation value determined at time t11, the current position estimation value determined at time t12, and the predetermined time duration td1.

Figure 4:
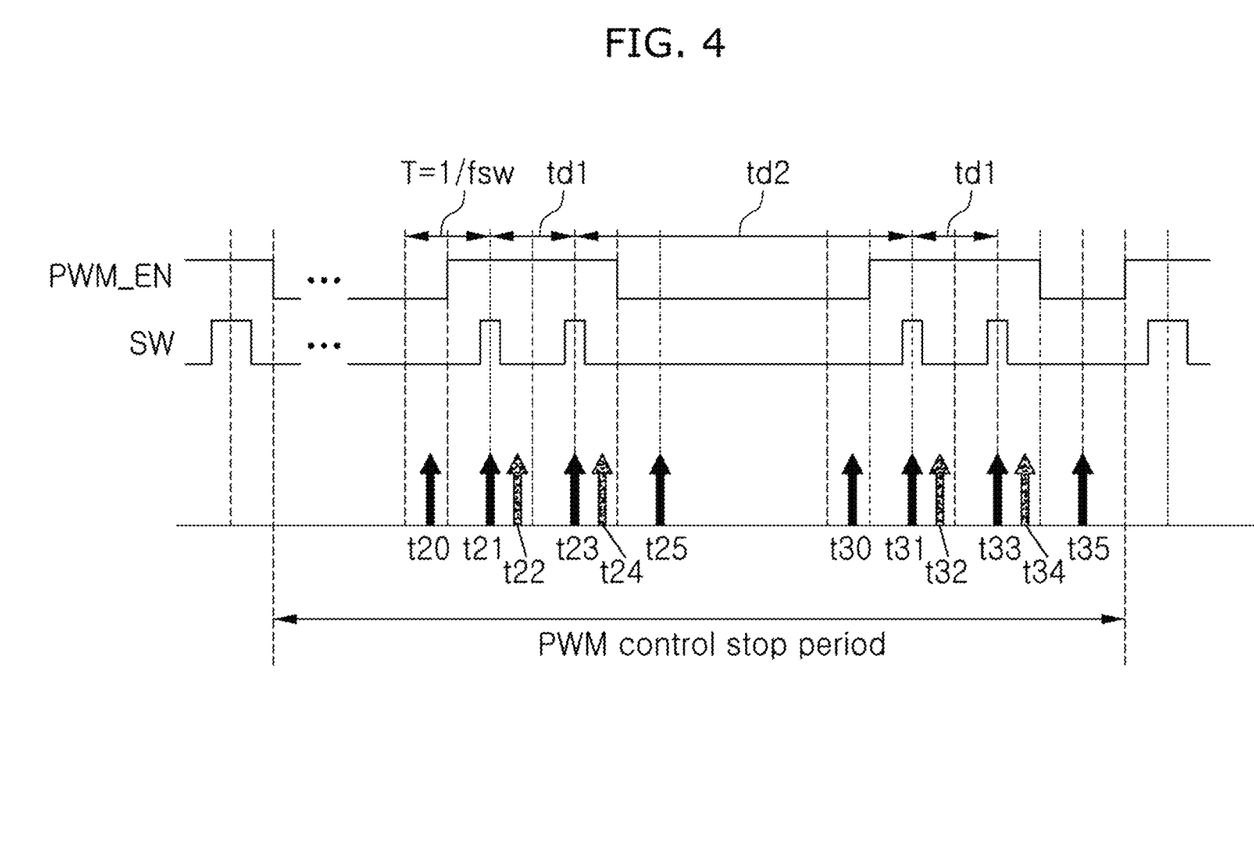
FIGS. 4 and 5 are timing diagrams explaining a procedure in which the controller estimates a current position and a current speed of the motor in a period in which execution of pulse width modulation control is stopped.
Figure 5:
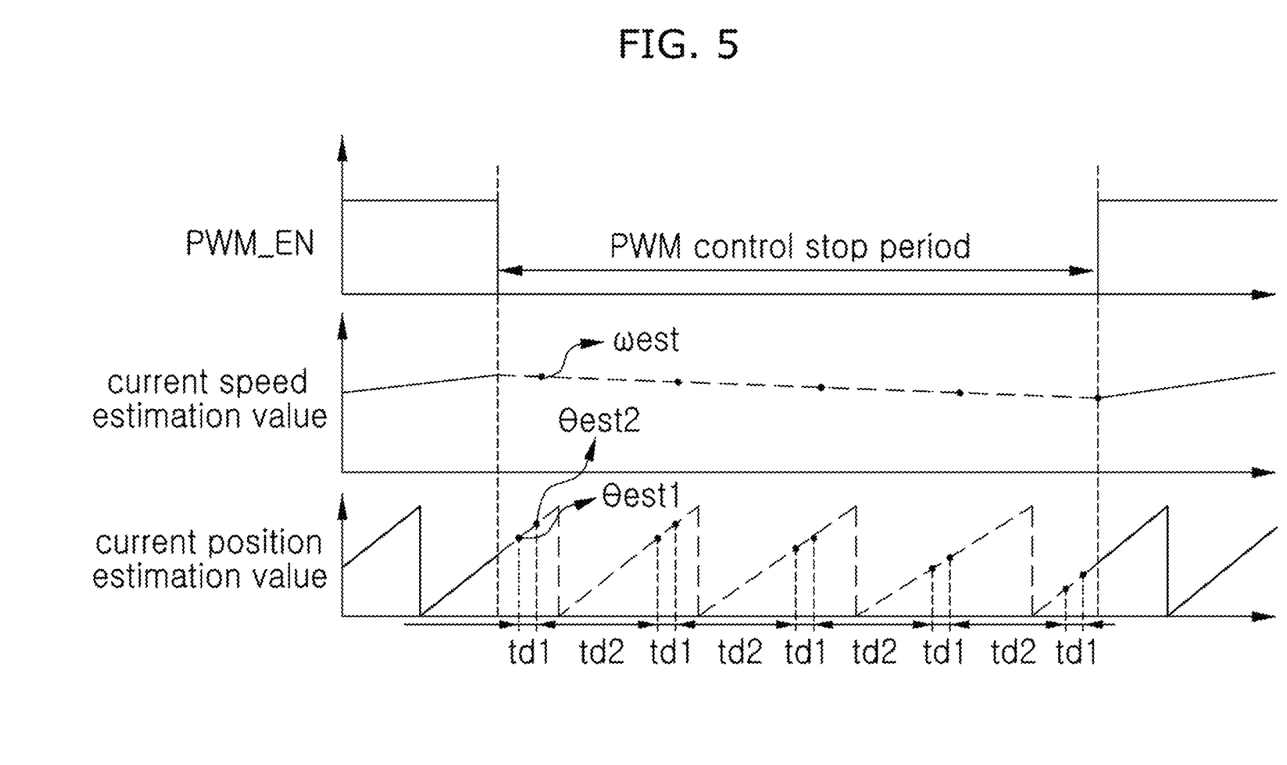

FIGS. 4 and 5 are timing diagrams explaining a procedure in which the controller estimates a current position and a current speed of the motor 10 in a period in which execution of pulse width modulation control is stopped.

Referring to FIG. 4, the controller 100 may output a switching signal SW through pulse width modulation control before and after a period in which execution of pulse width modulation control is stopped.

The controller 100 may determine a current speed estimation value of the motor 10 by applying a zero-voltage vector pulse to the switching signal SW at least two times at intervals of a predetermined time duration td1 whenever a predetermined period td1+td2 elapses in a period in which execution of pulse width modulation control is stopped. The predetermined period td1+td2 may be set by a sum of the predetermined time duration td1 and a predetermined time duration td2.

In more detail, the controller 100 may set a duty ratio of the zero-voltage vector pulse before application of the zero-voltage vector pulse to the switching signal SW (t20). Thereafter, the controller 100 may sense current of the motor 10 by applying the zero-voltage vector pulse to the switching signal SW (t21), and may determine a current position estimation value of the motor 10 based on results of the sensing (t22). After the predetermined time duration td1 elapses from time t21, the controller 100 may sense current of the motor 10 by applying again the zero-voltage vector pulse to the switching signal SW (t23), and may determine a current position estimation value of the motor 10 based on results of the sensing (t24).

Accordingly, the controller 100 may determine a current speed estimation value ωest of the motor 10 based on a current position estimation value θest1 of the motor 10 at time t22, a current position estimation value θest2 of the motor 10 at time t24, and the predetermined time duration td1, as expressed in Expression 1.

$$\omega est = (\theta est2 - \theta est1)/td1 \qquad \text{Expression 1}$$

In this case, the predetermined time duration td1 may be set to be not longer than a rotation period T of the motor 10 because estimation of the current position of the motor 10 should be performed two times during one revolution of the motor 10, and a lower limit of the predetermined time duration td1 may be determined taking into consideration errors of a current sensor and a motor control frequency. In this case, the rotation period T of the motor 10 may correspond to a reciprocal of a rotation frequency fsw of the motor 10.

Thereafter, the controller 100 may continuously perform stop of execution of pulse width modulation control when a difference between a value of a speed command and a current speed estimation value of the motor 10 is within a speed tolerance (t25).

After the predetermined time duration td2 elapses from time t23, the controller 100 may determine a current speed estimation value of the motor 10 by applying the zero-voltage vector pulse to the switching signal SW two times at intervals of the predetermined time duration td1 (t30 to t34). In this case, when the predetermined time duration td1 and the predetermined time duration td2 increase, the period in which current control of the controller 100 is not performed is also increased and, as such, efficiency of the motor driving apparatus may be enhanced.

The controller 100 may perform pulse width modulation control again when the difference between the speed command value and the current speed estimation value of the motor 10 exceeds the speed tolerance (t35).

Referring to FIG. 5, a procedure in which the controller 100 repeatedly determines a current position estimation value and a current speed estimation value of the motor 10 in a period in which execution of pulse width modulation control is stopped is shown. In this case, the PWM enable signal PWM_EN may be temporarily activated in the period in which execution of pulse width modulation control is stopped, for application of the zero-voltage vector pulse, as shown in FIG. 4. However, such control is not shown in FIG. 5, for convenience of illustration.

The controller 100 may determine current position estimation values θest1 and θest2 and a current speed estimation value ωest of the motor 10 by repeatedly performing an operation of applying the zero-voltage vector pulse to the switching signal two times at intervals of the predetermined time duration td1 whenever the predetermined period td1+td2 elapses in the period in which execution of pulse width modulation control is stopped.

Figure 6:
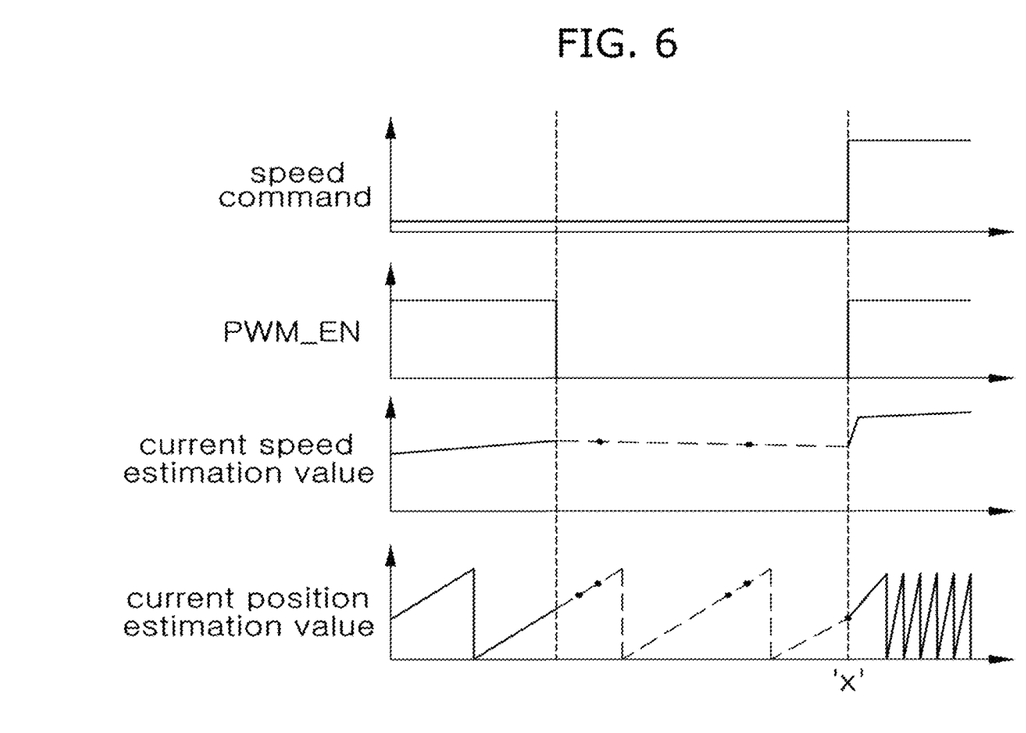
FIG. 6 is a timing diagram explaining a method in which the controller according to an exemplary embodiment of the present disclosure operates when a value of a speed command increases in a state in which execution of pulse width modulation control is stopped.

FIG. 6 is a timing diagram explaining a method in which the controller according to the exemplary embodiment of the present disclosure operates when a value of a speed command increases in a state in which execution of pulse width modulation control is stopped.

The controller 100 may apply the zero-voltage vector pulse to the switching signal when a value of a speed command applied to the controller 100 from an upper-level controller (not shown) of the controller 100 increases ("x") in a state in which execution of pulse width modulation control is stopped, in order to immediately respond to variation of the speed command value.

Accordingly, the controller 100 may determine a current position estimation value of the motor 10 by sensing current of the motor 10 at a time when the zero-voltage vector pulse is applied, and may perform motor current control based on results of the determination.

In accordance with an embodiment, the controller 100 may determine a current position estimation value of the motor 10 by applying again the zero-voltage vector pulse after a predetermined time duration elapses from the time when the zero-voltage vector pulse was applied, that is, the time "x", and may perform motor current control based on results of the determination.

Figure 7:
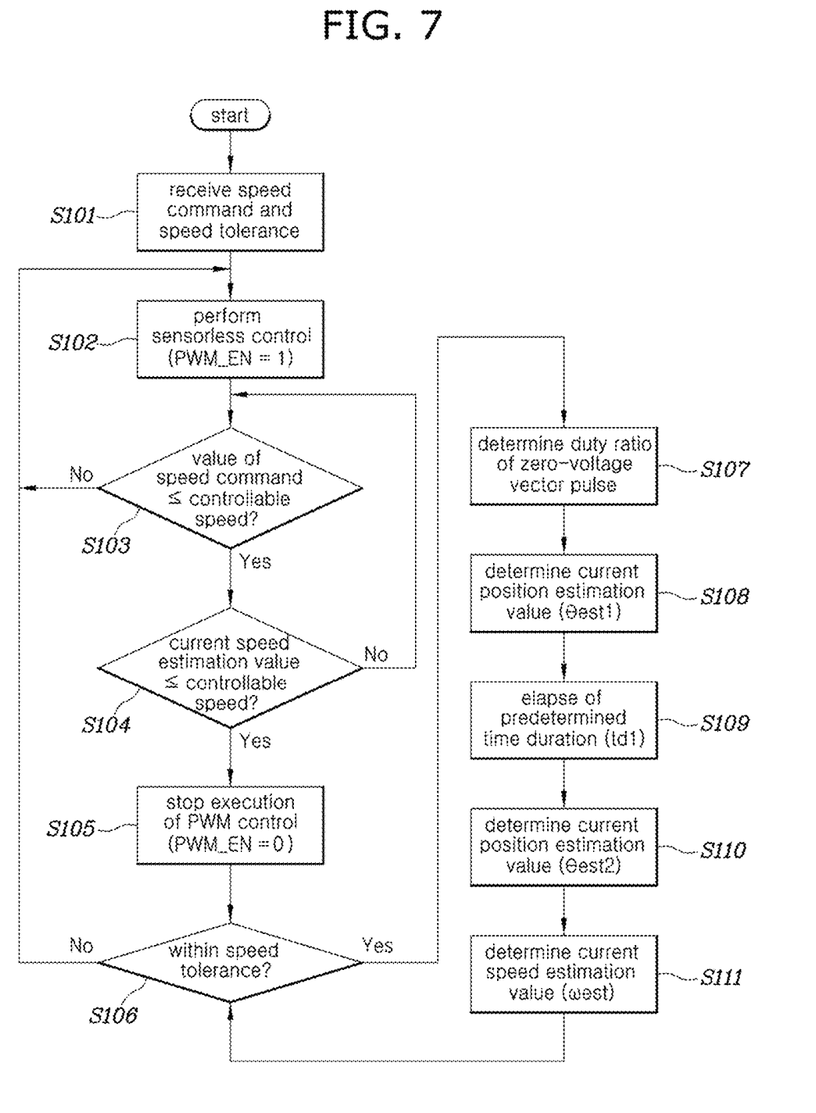
FIG. 7 is a flowchart explaining a method of controlling the motor driving apparatus in accordance with an exemplary embodiment of the present disclosure.

FIG. 7 is a flowchart explaining a method of controlling the motor driving apparatus in accordance with an exemplary embodiment of the present disclosure.

Referring to FIG. 7, the controller 100 may receive a speed command and a speed tolerance for the motor 10 from the upper-level controller (not shown) (S101) of the controller 100.

The controller 100 may output a switching signal to the inverter when pulse width modulation control is performed in accordance with activation of a PWM enable signal PWM_EN to "1", thereby performing sensorless control for control of driving of the motor 10 (S102). In this case, the controller 100 may estimate counter electromotive force of the motor 10 during execution of pulse width modulation control, so as to determine a current speed estimation value of the motor 10, and may adjust a duty ratio of a switching signal such that the current speed estimation value of the motor 10 traces a value of a speed command for the motor 10.

Thereafter, when a predetermined condition is satisfied in a state in which pulse width modulation control is performed, the controller 100 may stop execution of the pulse width modulation control (S103 to S105). As described above, the predetermined condition may be satisfied when the speed command value for the motor 10 and the current speed estimation value of the motor 10 are not higher than a predetermined controllable speed in a state in which the pulse width modulation control is performed.

In more detail, the controller 100 may determine whether or not the speed command value for the motor 10 is not higher than the predetermined controllable speed in a state in which pulse width modulation control is performed (S103). When the speed command value for the motor 10 is higher than the predetermined controllable speed ("NO" in S103), step S102 may be executed again.

When the speed command value for the motor 10 is not higher than the predetermined controllable speed ("YES" in S103), the controller 100 may determine whether or not the current speed estimation value of the motor 10 is not higher than the predetermined controllable speed (S104). When the current speed estimation value is higher than the predetermined controllable speed ("NO" in S104), step S103 may be executed again.

When the current speed estimation value is not higher than the predetermined controllable speed ("YES" in S104), the controller 100 may deactivate the PWM enable signal PWM_EN to "0", thereby stopping execution of the pulse width modulation control (S105).

The controller 100 may determine whether or not a difference between the speed command value and the current speed estimation value exceeds a speed tolerance in a state in which the pulse width modulation control is stopped (S106).

When the difference between the speed command value and the current speed estimation value exceeds the speed tolerance ("NO" in S106), the controller 100 may perform pulse width modulation control again.

When the difference between the speed command value and the current speed estimation value is within the speed tolerance ("YES" in S106), the controller 100 may execute steps S107 to S111.

The controller 100 may apply a zero-voltage vector pulse to the switching signal SW in a period when execution of pulse width modulation control is stopped, in order to determine a current speed estimation value west of the motor 10 (S107 to S111). In this case, the controller 100 may determine the current speed estimation value west by applying the zero-voltage vector pulse to the switching signal SW at least two times at intervals of a predetermined time duration td1 whenever a predetermined period elapses in a period in which execution of pulse width modulation control is stopped. In this case, the predetermined time duration td1 may be set to be not longer than a rotation period of the motor 10.

First, the controller 100 may determine a duty ratio of the zero-voltage vector pulse to be applied to the switching signal (S107).

Subsequently, the controller 100 may determine a current position estimation value θest1 of the motor 10 based on results of sensing of current of the motor 10 at a first time at which the zero-voltage vector pulse is applied to the switching signal (S108).

After the predetermined time duration td1 elapses from the first time (S109), the controller 100 may determine a current position estimation value θest2 of the motor 10 based on results of sensing of current of the motor 10 at a second time at which the zero-voltage vector pulse is applied to the switching signal (S110).

The controller 100 may determine the current speed estimation value west based on the current position estimation value θest1 at the first time, the current position estimation value θest2 at the second time, and the predetermined time duration td1 (S111). Thereafter, the determination procedure of step S106 may be performed again.

Meanwhile, the controller 100 may determine the current position estimation value of the motor 10 by applying the zero-voltage vector pulse to the switching signal when the speed command value for the motor 10 increases in a state in which the pulse width modulation control is stopped.

As described above, in accordance with the exemplary embodiment of the present disclosure, it may be possible to stably control the current and speed of the sensorless motor when pulse width modulation control is performed again by estimating a current position and a current speed of the motor 10 through application of a zero-voltage vector pulse to a switching signal input to an inverter in a period in which execution of the pulse width modulation control is stopped.

The present disclosure as described above may be embodied as computer-readable code, which can be written on a program-stored recording medium. The recording medium that can be read by a computer includes all kinds of recording media on which data that can be read by a computer system is written. Examples of recording media that can be read by a computer may include a hard disk drive (HDD), a solid state drive (SSD), a silicon disk drive (SDD), a read only memory (ROM), a random access memory (RAM), a CD-ROM, a magnetic tape, a floppy disk, an optical data storage, etc. Accordingly, the above detailed description should be understood as exemplary rather than limiting in all aspects. The scope of the present disclosure should also be interpreted by the claims below. All modifications as would be derived from the equivalent concept intended to be included within the scope of the present disclosure should also be interpreted as falling within the scope of the disclosure.

As apparent from the above description, in the motor driving apparatus configured to drive a sensorless motor based on pulse width modulation control in accordance with the exemplary embodiment of the present disclosure, it may be possible to enhance efficiency of the motor driving apparatus by stopping execution of pulse width modulation control when a predetermined condition is satisfied.

In addition, in accordance with the exemplary embodiment of the present disclosure, it may be possible to stably control the current and speed of a sensorless motor when pulse width modulation control is performed, by estimating a current position and a current speed of the motor 10 through application of a zero-voltage vector pulse to a switching signal input to an inverter in a period in which execution of pulse width modulation control is stopped.

The effects of the embodiments of the present disclosure are not limited to the above-described effects and other effects which are not described herein may be readily understood by those skilled in the art from the appended claims.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A motor driving apparatus comprising:
    a motor;
    an inverter configured to drive the motor based on a switching signal; and
    a controller configured to output the switching signal when pulse width modulation control is performed, to stop the pulse width modulation control when a predetermined condition is satisfied, and to apply a zero-voltage vector pulse to the switching signal in a period in which execution of the pulse width modulation control is stopped, for determination of a current speed estimation value of the motor,
    wherein the predetermined condition is satisfied when a value of a speed command for the motor and the current speed estimation value of the motor are not higher than a predetermined controllable speed in a state in which the pulse width modulation control is performed.

2. The motor driving apparatus according to claim 1, wherein the controller adjusts a duty ratio of the switching signal such that the current speed estimation value traces a value of a speed command for the motor, when the pulse width modulation control is performed.

3. The motor driving apparatus according to claim 1, wherein the controller determines the current speed estimation value by estimating counter electromotive force of the motor when the pulse width modulation control is performed.

4. The motor driving apparatus according to claim 1, wherein the controller performs the pulse width modulation control again when a difference between a value of a speed command for the motor and the current speed estimation value of the motor exceeds a speed tolerance in a state in which execution of the pulse width modulation control is stopped.

5. A motor driving apparatus comprising:
a motor;
an inverter configured to drive the motor based on a switching signal; and
a controller configured to output the switching signal when pulse width modulation control is performed, to stop the pulse width modulation control when a predetermined condition is satisfied, and to apply a zero-voltage vector pulse to the switching signal in a period in which execution of the pulse width modulation control is stopped, for determination of a current speed estimation value of the motor,
wherein the controller determines the current speed estimation value of the motor by applying a zero-voltage vector pulse to the switching signal at least two times at intervals of a predetermined time duration whenever a predetermined period elapses in a period in which execution of the pulse width modulation control is stopped.

6. The motor driving apparatus according to claim 5, wherein the predetermined time duration is set to be not longer than a rotation period of the motor.

7. The motor driving apparatus according to claim 5, wherein:
the controller determines a current position estimation value of the motor based on results of sensing of current of the motor at a first time at which the zero-voltage vector pulse is applied to the switching signal;
the controller determines a current position estimation value of the motor based on results of sensing of current of the motor at a second time at which the zero-voltage vector pulse is applied to the switching signal; and
the controller determines the current speed estimation value based on the current position estimation value at the first time, the current position estimation value at the second time, and the predetermined time duration.

8. The motor driving apparatus according to claim 7, wherein the controller determines the current position estimation value by applying the zero-voltage vector pulse to the switching signal when the speed command value for the motor increases in a state in which the pulse width modulation control is stopped.

9. A method of controlling a motor driving apparatus, the method comprising:
driving a motor by outputting a switching signal to an inverter, when pulse width modulation control is performed;
stopping execution of the pulse width modulation control when a predetermined condition is satisfied; and
applying a zero-voltage vector pulse to the switching signal in a period in which execution of the pulse width modulation control is stopped, for determination of a current speed estimation value of the motor,
wherein the predetermined condition is satisfied when the speed command value for the motor and the current speed estimation value of the motor are not higher than a predetermined controllable speed in a state in which the pulse width modulation control is performed.

10. The method according to claim 9, wherein the driving a motor comprises:
adjusting a duty ratio of the switching signal such that the current speed estimation value traces a value of a speed command for the motor.

11. The method according to claim 9, wherein the driving a motor comprises:
determining the current speed estimation value by estimating counter electromotive force of the motor, when the pulse width modulation control is performed.

12. The method according to claim 9, further comprising:
performing the pulse width modulation control again when a difference between a value of a speed command for the motor and the current speed estimation value exceeds a speed tolerance in a state in which execution of the pulse width modulation control is stopped.

13. The method according to claim 9, wherein the applying a zero-voltage vector pulse is executed to determine the current speed estimation value by applying the zero-voltage vector pulse to the switching signal at least two times at intervals of a predetermined time duration whenever a predetermined period elapses in a period in which execution of the pulse width modulation control is stopped.

14. The method according to claim 13, wherein the predetermined time duration is set to be not longer than a rotation period of the motor.

15. The method according to claim 13, wherein the applying a zero-voltage vector pulse comprises:
determining a current position estimation value of the motor based on results of sensing of current of the motor at a first time at which the zero-voltage vector pulse is applied to the switching signal;
determining a current position estimation value of the motor based on results of sensing of current of the motor at a second time at which the zero-voltage vector pulse is applied to the switching signal; and
determining the current speed estimation value based on the current position estimation value at the first time, the current position estimation value at the second time, and the predetermined time duration.

16. The method according to claim 15, wherein the applying a zero-voltage vector pulse is executed to determine the current position estimation value by applying the zero-voltage vector pulse to the switching signal when the speed command value for the motor increases in a state in which the pulse width modulation control is stopped.

\* \* \* \* \*